Dec. 18, 1956   R. C. McMASTER ET AL   2,774,887
RADIATION SENSING DEVICE
Filed Aug. 13, 1952

INVENTOR
ROBERT C. McMASTER
BY MICHAEL D. PHILLIPS
Frank J Steinhilber
ATTORNEY

United States Patent Office 2,774,887
Patented Dec. 18, 1956

2,774,887
RADIATION SENSING DEVICE

Robert C. McMaster, Columbus, and Michael D. Phillips, Obetz, Ohio, assignors, by mesne assignments, to The Haloid Company, Rochester, N. Y., a corporation of New York Application August 13, 1952, Serial No. 304,162
2 Claims. (Cl. 250—83.3)

This invention relates to devices for detecting radiation and, more particularly, to a radiation detector for detecting and measuring radiations at a point in the radiation field.

In the past, the detection and measurement of radiations have been achieved by devices such as ionization gages or Geiger counters. A characteristic of these gages and counters is their relatively large area requirement. Because of their size they cannot detect and measure radiations at a point of small surface area in a large field. Most of these devices require electron tubes, amplifiers, etc. to produce a signal in a usable form and their operation may involve high voltages which are hazardous to the operator. Likewise, their physical size generally makes them unsuitable as a portable instrument for use by persons engaged in occupations which involve considerable danger of exposure to radiations.

It is, therefore, an object of this invention to provide a detector for radiations which is responsive to X-rays, gamma rays, high-energy particles and the like.

It is a further object of this invention to provide a small, compact radiation detector suitable for detecting and measuring radiations at a point.

It is still another object of this invention to provide a radiation detector which will operate on low voltages of magnitude safe for the operator.

Yet another object of this invention is to provide a radiation detector which is small and compact within itself and requires no auxiliary bulky apparatus or equipment.

Other objects and advantages of the present invention will be apparent in view of the accompanying drawings and the following detailed description.

In general this invention relates to a radiation detecting device comprising a bead of material whose electrical conductivity is affected by radiation energy, light energy, particle excitation, etc., the bead being made a part of an electrical circuit sensitive to changes in conductivity of its elements and including a detector to indicate the occurrence of conductivity changes.

Figure 1:
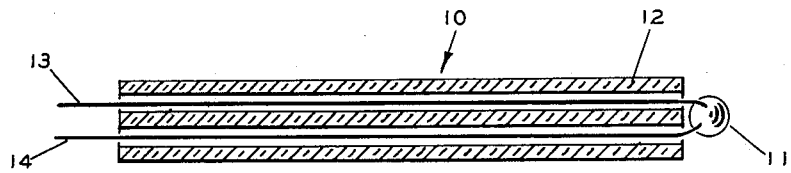
Figure 1 represents one embodiment of this invention showing a compact detector assembly.

An extremely simple form of a detector or sensing element generally designated 10 is shown in Figure 1. According to this embodiment of the invention, a small bead or other element 11 of radiation sensitive material such as, for example, selenium, is mounted on an elongated tube 12, optionally of an insulating material such as, for example, a ceramic tube. Two electric leads 13 and 14 lead through the tube to a detecting circuit as described hereinafter. The probing ends of the leads are embedded in the bead and are separated from each other so that the bead becomes an electric resistance in a circuit including the lead wires.

Figure 2:
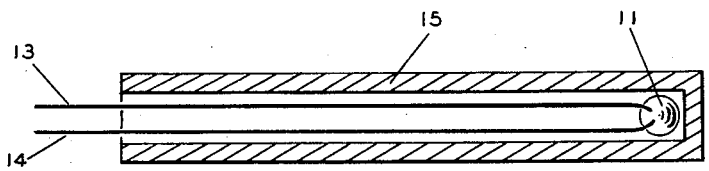
Figure 2 represents another embodiment of the invention showing a shielded detector bead.

In Figure 2 is shown another embodiment wherein the sensing element is shielded. In this figure, a sensing element 11 is enclosed in a shield 15 which may, for example, be lead or other shielding material which does not transmit radiation other than high energy level radiation and may act as a radiation intensifier. Electric leads 13 and 14 from the shield, here again connect the bead to a detector circuit. The sensing element in this figure is a shielded probe selectively sensitive to high energy or penetrating radiation.

Figure 3:
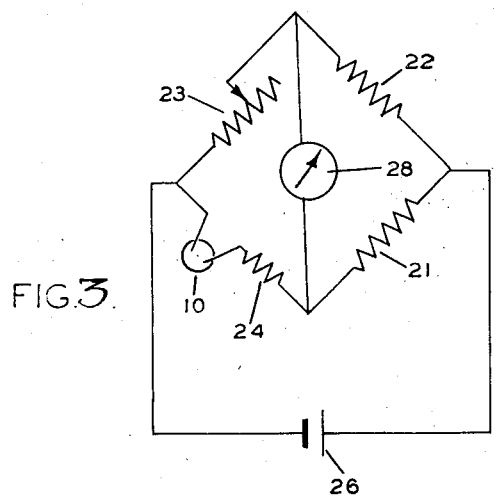
Figure 3 illustrates diagrammatically one of the embodiments and circuits suitable for the present invention.

Figure 3 illustrates how the sensitive element 10 may be made a part of an electrical circuit sensitive to changes in the electrical conductivity of one of the elements of the circuit. In the illustrated embodiment, the sensitive circuit comprises a Wheatstone bridge circuit. The bridge circuit is made up of fixed resistors 21 and 22, and variable resistor 23. A third fixed resistor 24 and the sensitive bead element 10 complete the resistance bridge. A low-voltage source, such as battery 26 and a detector, such as galvanometer 28 complete the electrical circuit. Conventionally resistors 21 and 22 are of roughly equal resistance value and the maximum resistance of variable resistor 23 is selected to be in excess of the normal resistance of bead 10 plus the resistance of resistor 24 when the bead is not being exposed to radiation, light or particle excitation.

It will be apparent that when variable resistor 23 is adjusted to a value exactly equal to the total resistance of the radiation detector element 11 and resistor 24, the resistance bridge will be balanced and no current will flow through resistor 24. Consequently, there will be no deflection of detector 28. Upon exposure of the sensing bead 11 to radiation or other excitation, the electrical conductivity of bead increases (the electrical resistance decreases) and the bridge is unbalanced. As a result, current flows through resistor 24 creating a signal which may be detected and measured by element 28.

Figure 4:
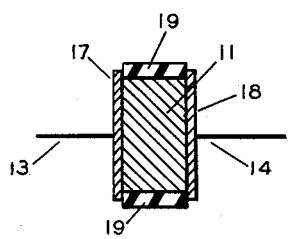
Figure 4 represents another embodiment of the invention wherein the sensing element is enclosed between electrodes.

In Figure 4 is illustrated a further embodiment of a sensitive element suitable for incorporation into any of the described forms of the invention. In this embodiment a wafer of sensing material 11 is enclosed between two electrodes 17 and 18 which are connected to electric leads 13 and 14, respectively. The sensing material optionally is also enclosed by side insulators 19 whereby the contents are protected against mechanical damage, vaporization or other loss or the like. It is apparent that this sensing material may be of measured thickness and cross section whereby it is readily calibrated and capable of uniform production for interchangeability. This unit is suitable for general employment in detecting circuits for radiation detection and analysis.

It will now be apparent that the operation of the present device depends upon the peculiar property, possessed by some materials, that their electrical resistivity is changed upon exposure to radiation quanta, light energy, or other forms of energy. For example, selenium is a material which is both photoconductive and subject to changes in electrical properties upon exposure to X-rays and other radiations and energy forms. Many other semi-conductors and photo-insulators possess similar properties of sensitivity to penetrating radiations, the properties being evident in altered resistivity in the presence of activating radiation.

Considering selenium, for illustrative purposes, it may be pointed out that this element in the vitreous form may have a resistivity in the order of $10^{15}$ ohm.-cm. in the dark, and that this resistivity may be decreased during irradiation by X-rays by a factor ranging from as low as five to as much as $10^{12}$, generally by several orders of magnitude. A change of resistivity in this range may readily be employed in an electrical circuit and detected and measured in various ways, for example as shown in Figure 5. Obviously numerous detector devices might be employed, for example, oscilloscopes, ohmmeter circuits, bias grids on vacuum tubes, galvanometers, etc., depending on the desired form of the results or readings.

A unit corresponding to the device illustrated in Figure 3 has been prepared using a vitreous selenium bead 1/16-inch in diameter as the radiation detector. The particular circuit had resistors of 100,000 ohms, corresponding to elements 21 and 22 in Figure 2, 1,000 ohms for element 24 in Figure 3, 250,000 ohms for element 23 of Figure 4, and a 1.5-volt battery for energy source 26. Detector element 28 was a recording potentiometer. The resistance of the selenium bead in the circuit was 110,000 ohms in the absence of radiation and could be reduced to 80,000 ohms when the bead was illuminated by an ordinary flash light for 2.5 seconds. This was used as a radiation detector for a 50 kvp. industrial X-ray unit while light shielded and the voltage on the X-ray tube was maintained at 50 kvp. and the filament current varied from 5 milliamperes to 40 milliamperes. The test device clearly indicated radiation intensity according to the change of resistance in this device.

The sensitivity of the present device can be readily increased or decreased at will. This can be done, for example, by inserting a resistor in shunt or in series with the detector bead. As in the case of the selenium bead, when the bead is light sensitive as well as sensitive to penetrating radiations, the entire device can be readily checked and calibrated at any time with an ordinary flashlight. Thus a user about to enter an area where subjection to radiation was likely, if possible, can check the detector to satisfy himself that it is operating satisfactorily, prior to entering such area.

In view of its unique ability to measure radiation intensity at a point in a radiation field, the present device finds extreme utility in the mapping of X-ray or other radiation fields. This enables many interesting and important investigations of radiation fields, for example, the mapping of the radiation field near the port of an X-ray tube.

Other arrangements and combinations based upon the invention are readily suggested for various applications. For use in comparing radiations, two or more beads can be used in a single bridge circuit, one of these, for example, being a standard bead, whereby effects due to temperature variations source voltage variations, etc. can be eliminated. Such an arrangement would be advantageous for differential-type measurements.

In some embodiments, as shown in Figure 2, a shield selectively resistant to transmission of certain activating radiation may be provided for the sensitive bead so as to produce a device responding only to one type or band of radiation such as, for example, a shield of lead or the like to make the device sensitive only to highly penetrating radiation. By comparison of readings taken with such a device and readings obtained on unshielded beads, the quality of the radiation can be ascertained. Such instruments would be very useful for measuring extremely intense radiations or to distinguishing between types of radiations. Thus, such a device with, for example, a two-inch shielding would provide an instrument of reasonable size for measuring radiations for which prior art type Roentgen meters require substantially large areas and spaces.

Increased response from the device of the present invention may be obtained in many ways, some of them of apparently contrasting nature. Thus, the response from the sensitive bead may be intensified either by adding a phosphor coating to the bead or by providing a lead screen about the bead. In the one case, the effect of light adds to the response of the bead, while, in the other case, electrons knocked from the lead screen add to the response of the bead.

In constructing the sensitive element 10 and in selecting the material or materials for the element, it is obvious that the nature of the activating radiation will be considered. For example, for general purposes a photoconductor such as selenium in its vitreous form, anthracene, sulfur, tellurium or the like is found fully adequate. Likewise, many semi-conductors or insulators which are generally considered as non-conductors under normal conditions, become significantly conductive under the influence of beta particles, gamma radiations, electron beads, alpha particles, positrons and various nuclear reaction particle products, and these materials may be employed as the sensitive element for such radiation. For example, many insulating resins such as styrene, the acrylic resins and the like are normally insulators but can be significantly conductive in very high energy radiation fields, and the choice of such a material as the sensitive element affords another approach to a selective radiation detector specifically sensitive to such high energy level radiations.

Numerous advantages and applications of the present invention have already been pointed out. Others are readily apparent. High voltages which are used with Geiger counter and ionization gage type instruments and which are hazardous to the operator are eliminated, or made unnecessary. Low resistance beads can operate off very low voltage batteries (of the order of 1.5 to 6 volts, for example). Energy sources may be either D.-C. or A.-C., the latter of any desired frequency. A further advantage rests in the fact that the original resistivity of the bead is restored almost immediately following exposure to radiations. The beads are not permanently affected by radiations.

Numerous variations and changes in design of the device may be effected to meet the requirements of any particular problem. Beads may be mounted on extensions or probes for measurements in fields distant from the observer, or not readily accessible to ordinary instruments. Telemetering systems can be adapted to convey the bead response to the detector element. Small beads could readily be attached to needle points for insertion into the human body, making possible measurements of radiation intensities existing in the body. Still other advantages and applications of the present invention will be apparent to those skilled in the art and are intended to be made a part of the present invention insofar as they are within the scope of the attached claims.

What is claimed is:

1. An X-ray detector, comprising a voltage source, an electric circuit operatively connected to said source, said circuit including a selenium element in vitreous form in electrical series with said source, and means for detecting changes in the electrical resistance of said element, said vitreous form selenium being characterized by the property of varying in electrical resistance in response to irradiation by electromagnetic energy with preferential sensitivity to the X-ray region of the spectrum of said energy over the visible region thereof.

2. An X-ray detector as set forth in claim 1, and further including a shield encompassing said selenium element, thereby limiting the character of electromagnetic energy reaching said element.

References Cited in the file of this patent

UNITED STATES PATENTS

| 1,229,740 | Furstenau | June 12, 1917 |
| 2,259,372 | Geisler | Oct. 14, 1941 |
| 2,316,576 | Fearon | Apr. 13, 1943 |
| 2,537,388 | Wooldridge | Jan. 9, 1951 |
| 2,547,173 | Rittner | Apr. 3, 1951 |

OTHER REFERENCES

Photo-Electricity, by Zworykin and Ramberg. Copyright 1930, published by John Wiley & Sons, page 176.